(12) United States Patent
Isakov et al.

(10) Patent No.: US 7,232,152 B2
(45) Date of Patent: Jun. 19, 2007

(54) METHOD OF BRINGING TO READINESS AN INFLATABLE AIRBAG OF SAFETY DEVICE, SAFETY DEVICE FOR A VEHICLE, VALVE DEVICE

(76) Inventors: Sergey Nikolaevich Isakov, Pr. Severny, 83-154, 195252 St. Petersburg (RU); Sergey Vasilyevich Yurkin, Pr. Severny, 83-154, 195252 St. Petersburg (RU)

(*) Notice: Subject to any disclaimer, the term of this patent is extended or adjusted under 35 U.S.C. 154(b) by 210 days.

(21) Appl. No.: 10/482,900

(22) PCT Filed: Apr. 30, 2002

(86) PCT No.: PCT/RU02/00225

§ 371 (c)(1),
(2), (4) Date: Jan. 2, 2004

(87) PCT Pub. No.: WO03/011651

PCT Pub. Date: Feb. 13, 2003

(65) Prior Publication Data

US 2004/0169359 A1  Sep. 2, 2004

(30) Foreign Application Priority Data

Jul. 13, 2001  (RU)  ............... 2001120313

(51) Int. Cl.
*B60R 21/26*  (2006.01)

(52) U.S. Cl. .................. 280/736; 280/742; 137/219
(58) Field of Classification Search ............... 280/735, 280/736, 741, 742; 137/219; *F16K 31/12*
See application file for complete search history.

(56) References Cited

U.S. PATENT DOCUMENTS

| | | | | |
|---|---|---|---|---|
| 3,684,309 A | * | 8/1972 | Uchiyamada et al. | ....... 280/735 |
| 3,690,695 A | * | 9/1972 | Jones et al. | ................. 280/741 |
| 3,741,585 A | * | 6/1973 | Hendrickson et al. | ...... 280/741 |
| 3,781,496 A | * | 12/1973 | Jones, Sr. | ............ 200/61.45 R |
| 3,833,029 A | * | 9/1974 | Munn | ............................. 141/4 |
| 5,062,662 A | * | 11/1991 | Cameron | .................... 280/733 |
| 5,492,359 A | * | 2/1996 | Oliver | ..................... 280/728.1 |

(Continued)

FOREIGN PATENT DOCUMENTS

DE     40 11 492 A1    10/1991

(Continued)

OTHER PUBLICATIONS

Vargaftik, N., Handbook of Thermophysical Properties, "Nauka", Moscow, 1972, p. 168.

(Continued)

*Primary Examiner*—Eric Culbreth
*Assistant Examiner*—Barry Gooden, Jr.

(57) ABSTRACT

A method of bringing to readiness an inflatable airbag of a safety device is characterized in the interruption of the gas flow through the inlet of the airbag at a specified time instant. The interruption of the gas flow through the inlet of the airbag alternates with its resumption, generating a sequence of gas flow pulses of controllable duration and on/off time ratio.

A safety device comprises the airbag (1) a gas source (3), and a valve device (8). The valve device is formed by a pneumatic distributor having two stable positions: an open position, and a closed position.

22 Claims, 6 Drawing Sheets

U.S. PATENT DOCUMENTS

| | | | | |
|---|---|---|---|---|
| 5,725,243 | A * | 3/1998 | Skanberg | 280/737 |
| 5,927,753 | A * | 7/1999 | Faigle et al. | 280/735 |
| 6,231,077 | B1 * | 5/2001 | Karolek et al. | 280/735 |
| 6,607,214 | B2 * | 8/2003 | Blakemore et al. | 280/741 |
| 2003/0034642 | A1 * | 2/2003 | Blakemore et al. | 280/741 |

FOREIGN PATENT DOCUMENTS

| | | |
|---|---|---|
| DE | 40 41 049 A1 | 7/1992 |
| DE | 195 26 334 A1 | 1/1997 |
| RU | 2005249 C1 | 4/1992 |

OTHER PUBLICATIONS

"Hoerbiger Interface" advertising booklet on their 3/2 Piezo Miniature Valve, Hoerbiger-Origa Corporation, 100 west Lake Drive, Glendale Heights, Illinois,USA,publish date unknown but prior to priority date of the present application.

"Burevestnik" advertising booklet, 68 Malbokhtinsky St., St. Petersburg, Russia, publish date unknown but prior to priority date of the present application.

Loitsansky, L. G., Fluid Mechanics, Nauka, Moscow, 1973, pp. 403-406.

* cited by examiner

METHOD OF BRINGING TO READINESS AN INFLATABLE AIRBAG OF SAFETY DEVICE, SAFETY DEVICE FOR A VEHICLE, VALVE DEVICE

FIELD OF THE INVENTION

The invention relates to safety devices with an inflatable airbag, such as a safety air-cushion, designed to be installed on vehicles, in particular, in the area of the driver's and passenger's seats within the cab/cabin of a car or the cockpit of an aircraft.

BACKGROUND OF THE INVENTION

In its most general form, the safety device of air-cushion type comprises a gas-inflatable airbag having an inlet opening for the entry of gas and a system for feeding the gas flow into the airbag including a gas source, a duct for communicating the inlet with the gas source, and a triggering unit that serves to detect the accident and provide a signal for generating the gas flow from the gas source to the airbag.

With the vehicle in its normal operating conditions, the airbag lies folded adjacent the driver's or passenger's seat, e.g. in the steering wheel or in the dashboard in front of passenger. During an accident, in response to signal from the sensor, the airbag must be inflated to bring it to the ready status within an average of 40 msec. In this case, the inflated airbag protects a person from shocks, vibrations etc, restricting his movements inside the vehicle.

In known safety devices, a compressed-gas reservoir or a pyrotechnical gas generator containing a solid substance which is burned to produce gas is used as the gas source in the gas flow feeding system. Combined gas sources consisting of both compressed gas and the pyrotechnical gas generator are also known in the art.

Pyrotechnical gas generators have been widely used in safety devices such as safety cushions. One disadvantage of their use, however, resides in the Besides, the gas produced is of a toxic nature and therefore, along with operation of the safety device, a forced ventilation system needs to be actuated to remove the toxic gas the cabin.

In addition, a fresh pyrotechnical gas generator has to be installed for the repeated use of a safety device, resulting in increased maintenance costs of the safety devices.

The use of a compressed-gas reservoir to serve as the source avoids the risk of burns and poisoning.

In known safety devices of the type, however, the gas supply to the airbag is generally characterized by destroying a fragile membrane serving as the quick-exhaust valve, which, prior to starting the safety device, shuts off the flow section between the compressed-gas reservoir and the inlet opening of the airbag, (U.S. Pat. No. 5,152,550). The membrane destruction is accompanied by a production of rather sharp fragments, which, as they get into the airbag, may damage it and even cause injury to people. In order to prevent the fragments from hitting the airbag, a filter is mounted before the inlet of the airbag. The filter, however, increases the hydraulic resistance in the inlet opening of the airbag, whereby its filling rate is slowed down.

Moreover, for repeated use of such safety device, either the membrane alone or the whole gas-flow feeding system has to be replaced, which requires a special skill from the serviceman making the replacement operation, thus increasing the maintenance costs of the safety device.

This drawback may be eliminated by placing a multiuse quick-exhaust valve between the gas source and the airbag inlet, such as disclosed, for example, in RU, C1, 2005249.

The valve device of RU, C1, 2005249 comprises a body forming a valve cavity with three ducts communicating with the valve cavity: a first duct lying between the valve cavity and the low-pressure space, a second duct between the valve cavity and the high-pressure space, and a third duct connecting the valve cavity, via the control valve, with the atmosphere and the controlling pressure source.

Located within the duct is a valve seat including at least two spaced annular flanges combined to form a circular passage tapering towards the low-pressure space.

The valve comprises a stop member including a movable dome-shaped shutoff device with its vertex facing the first duct and a hollow cylindrical guide with its outer openings coaxial with the first and second ducts, respectively, both located inside the valve cavity and jointed in a telescopic manner.

The movable shutoff device is made of an elastic material and consists of a domed part and a cylindrical part.

The third duct passes through the valve body and the body of the hollow guide, connecting the guide cavity, via the control valve outside the quick-exhaust valve body, either with the atmosphere or with an external source of the controlling pressure.

In the valve ready to work (closed position), the gas pressure within the guide cavity and beneath the domed part of the shutoff device is equal to that within the high-pressure space. The dome-shaped part of the shutoff device is snug against the annular flanges of the seat, whereas between the end faces of the cylindrical part of the shutoff device and the guide, there is formed an annular gap communicating the space beneath the domed part with the valve cavity.

As the valve is operated (i.e. brought to an open position), the guide cavity and, hence, the cavity beneath the dome of the shutoff device, is relieved of gas pressure through the third duct. The consequence of the pressure relief is a drop in the pressure forcing the domed part of the shutoff device against the seat. The shutoff device then moved off the seat, moving along the guide as far as its end, so that the flow section of the first duct is opened.

It will be noted that the valve having a flow area of up to 20 cm is opened within the time not exceeding 1 msec.

In order to bring the valve to an initial, i.e. closed, position, compressed gas is supplied along the third duct to the guide cavity from an external control pressure source. The increased pressure acts upon the domed part of the shutoff device which is thus moved along the guide towards the first duct, closing it.

The use of the aforementioned quick-exhaust valve, rather than fragile membranes, in safety devices such as an inflatable safety cushion, would prevent the formation of fragments. In addition, the valve of RU, C1, 2005249 is a multiple-action device, and its use in the safety device would result in lower maintenance costs of the same.

The presence of an external control gas source, however, leads to a rather large-sizes valve, thus limiting its applications, in particular, as concerns safety devices. Furthermore, because of the external control gas source, the valve closing time substantially exceeds its opening time, which puts further limitations on the applications of such valve. Specifically, the valve device of Patent RU, C1, 2005249, being a quick-exhaust valve, fails to provide a controllable fill-up of the airbag in the safety device.

Known in the art are methods of bringing the inflatable airbag to readiness, wherein the process of filling the airbag is dependent on variable parameters such as the mass of the person protected, his position relative to location of the inflated airbag, the speed of the vehicle at the time of the accident, etc.

It is known, for example, that in order to restrict the movement of bulky and heavy driver/passenger, as the vehicle collides at a high speed, there is a need for the airbag to be rapidly filled up to a higher excess pressure, while the protection of a small person (such as a child), with a low speed at the moment of collision, requires a slower airbag inflation rate with a lower excess pressure, so as to avoid injuring the person to be protected by too rigid airbag, while providing a sufficient fillup of the airbag to allow an effective restriction of the person's displacement.

Known in the art are safety devices in which the gas source, for the control-label filling of the airbag, is made multi-element, i.e. consisting of two or more gas generators (U.S. Pat. No. 6,168,200), or two or more pressure-gas reservoirs (DE, C, 4011492,) or else including both the gas generator and the pressure-gas reservoir, i.e. combined gas sources (U.S. Pat. No. 5,738,371).

The airbag filling in said devices is controlled by providing a preset time delay between initiations of the gas flow from the gas source elements (U.S. Pat. No. 6,168,200, DE, C 4011492).

Such airbag fillup control, however, fails to provide the filling conditions required for optimum protection.

This is due to a limited range of available airbag-filling regimes defined at the device design stage and specified by initial parameters of the gas source, namely, by the number of its components and the delay between their actuation times. The specified airbag-filling mode, as it is brought to readiness, does not depend on the nature of the accident.

Besides, the devices with a multielement gas source, particularly those including several tanks with compressed gas, are rather bulky and have a more complex system of gas supply to the airbag. Specifically, in DE, C, 4011492, each reservoir is provided with a separate pipe for gas supply to the airbag.

Also known in the art is a safety device providing a wider range of airbag-filling modes available (U.S. Pat. No. 5,400,487). In this device, the multi-element gas source includes at least two pyrotechnical gas generators of different output. Moreover, the gas-flow supply triggering unit comprises a vehicle acceleration transducer, an IR sensor for measuring the position of the person to be protected with respect to the airbag, and a computer. As the computer processes the signals arriving from the sensors during the development of the accident, it determines the shape of the "amount of gas enclosed vs time" curve, which is optimum for protection of persons. According to a specific curve, the computer chooses the sequence and delay times for igniting different gas generators are selected in accordance with nine probable types of emergency situations.

In other words, in this method and embodiment, the range of available airbag-filling modes is also defined by the initial parameters of the gas source.

In addition, the airbag-filling regime, at the time of accident, is based on the information obtained and analyzed only up to the moment of igniting the last gas generator, so that the airbag-filling cannot be controlled during the accident, as would be desired to provide optimum protection.

Further the more than one gas generator will increase the size of the device. Again, the repeated use of the safety device would require the gas generators to be replaced, thereby increasing the operating costs of the device.

SUMMARY OF THE INVENTION

It is an object of the present invention to provide a method of bringing to readiness an inflatable airbag of a safety device such as the safety cushion, a safety device for protection a person inside a vehicle, and a valve device, in which the process of filling the airbag with gas, as it is brought to readiness, is controlled so the airbag-filling regime established during the accident would meet, as much as possible, the optimum conditions providing an effective protection of a person inside a vehicle, while allowing a small size of the safety device in normal conditions and its repeated use without disassembly.

It is another object of present invention to provide a valve device with its closing and opening times short enough to allow its use as a controlling pneumatic distributor for different purposes, including that of controlling the process of filling the airbag with gas.

With these objects in view, there is prvided a method of bringing to readiness an inflatable airbag restricting the movement of the person to be protected inside a vehicle, in case of accident, comprising the filling the airbag with gas through its inlet opening, depending on the parameters specified, according to the invention, the adjustment includes an interruption of the gas flow through the airbag inlet at a specified time.

The controlled interruption of the gas flow through the airbag inlet allows the adjustment of the limit value of gas fed into the airbag within the specified time needed to reach the ready status of the airbag. In this case, an excess pressure may be developed in the inflated airbag, which will prevent the person from being injured by a too rigid airbag, but will be sufficient to provide his/her effective protection.

It is reasonable that, as the airbag is filled up to the state of readiness, the interruption of the gas flow through the inlet of the airbag be alternated with its resumption, thereby generating a sequence of gas flow pulses through the airbag inlet, the pulse width and their spacing being controlled.

Pulsed supply of the gas flow to the airbag, with a controlled pulse width and spacing, enables the airbag fill-up speed and the excess pressure in the inflated airbag to be adjusted within a wide range.

It is preferred that the width of pulses passing the inlet opening of the airbag and the length of intervals between the pulses be specified according to the curve of the 'amount of gas enclosed vs time' relationship which is defined during the accident as being optimum for the person's protection. The optimum 'enclosed gas vs time' curve is here approximated by a step function. Within sloped sections of the step function, gas is supplied from the airbag inlet, while within horizontal sections of the step function, the gas flow through the inlet is interrupted.

In this case, the pulse width and pulse spacing is controlled according to the optimum mode of airbag-filling during the accident, necessary for protection of people, thereby providing a wider range of airbag-filling modes available. In particular, repeated impacts of the vehicle at accident may be accounted for.

Approximation of the optimum 'enclosed gas vs time' curve by a step function allows a pulsed gas supply to be implemented.

It is expedient that the gas flow through the airbag inlet be controlled by a valve device opening and closing the flow section of the duct connecting the airbag inlet with the gas source. The valve device may be controlled by a trigger unit computer.

The trigger unit computer processes the accident information, as it is developed, and uses the step function of the 'enclosed gas vs time' relationship to produce a pulsed output signal controlling the valve device.

Now, the pulse widths and spacings are not dependent on the initial parameters of the gas source, allowing a great variety of available airbag-filling modes.

A wide range of available airbag-filling modes and a possibility to control the airbag inflation, as the accident is developed, enable the actual airbag-filling conditions to be most closely approximated by mode corresponding to the optimum curve of the 'enclosed gas vs time' relationship determined at the time of accident by the safety device trigger unit computer.

The proposed method can be implemented, using known gas sources, e.g. with a pyrotechnical gas generator or with compressed gas. It will be noted that different airbag-filling modes are provided with a gas source including a single element (one pressure-gas reservoir or one pyrotechnical gas generator), which results in a rather small size of the gas source and facilitates the installation of the safety device inside the vehicle, say, in the steering column.

Further extension of the range of available airbag-filling modes is achieved by adjusting the amplitude of pulses, which is specified, for example, by the initial gas pressure value in the gas source.

The aim is also attained by providing that in a method of bringing to readiness an inflatable airbag, including the parameter-specified filling of the airbag, through its inlet, from the gas source comprising a reservoir with a working medium under pressure, the airbag inflation being controlled by changing the pressure of the working medium in the gas source, according to the invention, liquefied carbon dioxide in the reservoir being controlled through the adjustment of the temperature.

At an abrupt pressure drop (in this case, when the valve is quickly opened) the liquefied carbon dioxide boils all over its volume and changes to a gaseous form, i.e. carbon dioxide that fills up the airbag (Pressure Decay Boiling in Reduced Gravity. Saiz J., AIAA Pap. No 1993, 1994, pp. 1–9).

The pressure control of the liquefied carbon dioxide in the container by changing its temperature is the based on the known sharp dependence of the saturated liquefied vapors of liquefied carbon dioxide on temperature (N. Vargaftik, Handbook of Thermophysical Properties, "Nauka", Moscow, 1972, p. 168). In this case, the pressure control of the working medium in gas the source is provided by a single-element gas source, which reduced the size of the gas source and simplifies operation and design arrangement of the safety device.

It is advisable that the initial pressure of the liquefied carbon dioxide in the reservoir be adjusted according to the mass of the person protected, the initial pressure being set as the person takes a seat in the vehicle.

In this case, the specified initial pressure in the gas source determines the speed of filling the airbag according to the mass of the person protected.

A wider range of airbag-filling modes is provided by a pulsed supply of the carbon dioxide flow, with a controlled pulse and space duration, as well as a controlled pulse amplitude.

The aim is also attained by providing that in a safety device installed in a vehicle, comprising an inflatable airbag with an inlet opening for receiving gas filling the airbag until the ready state is reached, and a gas supply system for filling the airbag until the ready state is reached, the gas supply system including a gas source, a valve device and a triggering unit, according to the invention, the valve device is designed as a pneumatic distributor having two stable positions, namely: an open position, when gas is fed from source to the airbag through its inlet, and a closed position, when the gas flow through the inlet is interrupted.

The pneumatic distributor allows the control of at least the excess pressure in the inflated airbag by interrupting, at a specified time, the gas flow through the airbag inlet.

It is preferred that the pneumatic distributor be capable of changing from one of its stable positions to the other one, at least three times within the period of filling the airbag to its ready state.

Now, within the time of filling the airbag to the state of readiness, there are provided at least two period of the open position of the pneumatic distributor, when gas is fed to the airbag through its inlet, and a period of the closed position of the pneumatic distributor, when the gas flow to the airbag through its inlet is interrupted. By alternating these periods, gas flow pulses through the airbag inlet are produced. By adjusting the duration of the open and closed position of the pneumatic distributor and, hence, the duration of gas flow pulses and of space therebetween, the airbag inflation speed is controlled.

It is preferred that the pneumatic distributor be capable of changing one of its stable positions to the opposite one within a period of time not exceeding 3 to 6 msec.

In this case, within the period of bringing the airbag to its ready state, as many as 7 to 10 gas flow pulses may be produced, so that the optimum curve of the time relationship of enclosed gas in the airbag may be well enough approximated by a step function.

The pneumatic distributor providing the above characteristics comprises a main valve mounted before the inlet and having two stable positions, namely, an open position in which gas is fed from the source to the airbag, and a closed position in which gas from the source is prevented from being fed to the airbag, and a control valve designed as electropneumatic distributor with two stable positions, causing the main valve to be switched from one stable position to the other one.

It is reasonable that the trigger unit comprise an acceleration transducer, a position pickup sensing the position of the person to be protected with respect to the airbag, and a computer connected with said transducers and with the control valve, the computer being capable of using the sensor readings to choose an optimum mode of airbag-filling during the accident, necessary to protect the person, and applying to the control valve, according to said mode, of electric signals causing the control valve to be switched from one stable position to the opposite one.

Owing to the fact that the triggering unit determining the optimum airbag-filling mode controls the pneumatic distributor as the accident develops, the airbag-filling mode embodiment in the proposed device will be close to that optimum mode, thus ensuring an effective protection of a human being during the accident.

Also, with the above objects in view, in a safety device installed inside a vehicle, comprising an inflatable airbag having an inlet for receiving the gas filling the airbag until the ready state is reached, and a system for supplying gas to the airbag, including a gas source having a reservoir filled with a working medium under pressure, a valve device located between the airbag inlet and the gas source, and a triggering unit, according to the invention, the working medium used to fill the reservoir is liquefied carbon dioxide.

Carbon dioxide contained in the reservoir in a liquefied state, with its amount sufficient to inflate to the airbag, occupies a volume which is just a fraction of that occupied by the compressed gas, facilitating the installation of the safety device in the vehicle.

In addition, as shown by the inventors experiments, when liquefied carbon dioxide serves as the working medium, the airbag-filling speed is higher than is the case with the compressed gas under the same thermodynamic conditions.

This enables the main valve flow section diameter to be reduced, thus resulting in a smaller size of the safety device.

It is appropriate that the triggering unit comprise a computer-aided sensor for measuring the mass of the person to be protected, and gas source reservoir be provided with a temperature controller connected with a computer and capable of varying the temperature of liquefied carbon dioxide in the reservoir according to the readings of said sensor.

The temperature controller connected with a computer allows the adjustment of the initial pressure of liquefied gas depending on the mass of the person protected, thereby improving the protection effect.

In one embodiment of the safety device, the gas source includes a pyrotechnical gas generator.

In another embodiment of the safety device, the gas source comprises a reservoir with the pressure working medium.

In the latter embodiment, a repeated use of the safety device is allowed. In order to reset the safety device, the reservoir only needs be filled with an amount of the working medium sufficient to fill the airbag until the ready status is reached. The reservoir fill-up is carried out without any disassembly of the safety device.

The choice of one of the embodiments of the gas source determines the design of the main valve of the pneumatic distributor.

The gas source formed by a pyrotechnical gas generator comprises a body with an outlet connected by a duct with the inlet of the airbag, a solid gas-producing substance and an electric blasting cap connected with a computer.

When dealing with such gas source, it is preferable that the main valve be mounted inside the body of the gas source, dividing the inner space of the body into a first chamber having an outlet connected with the duct, and a second chamber connected with the atmosphere through the exhaust port, both chambers communicating with each other, the outlet opening and the exhaust port having mounted therein a first seat and a second seat of the main valve, having each at least one annular flange forming a circular passage tapering outwards, the main valve comprising a stop member including a guide consisting of a first cylindrical guiding portion located in the first chamber and telescope-jointed to a first movable dome-shaped shutoff device with its vertex facing the outlet and coaxial therewith, a second cylindrical guiding portion located in the second chamber and telescope-jointed to a second dome-shaped shutoff device with its vertex facing the exhaust port and coaxial therewith, and a central portion connected with the gas source body, the first cylindrical guiding portion having provided therein a first cavity with an outside hole at the first chamber end, coaxial with the outlet, the second guiding portion having provided therein a second cavity with an outside hole at the second chamber end, coaxial with the exhaust port, the central portion having a third cavity with an outside hole at the first chamber end, beyond the dome-shaped shutoff-device, and duct for communicating the first and second chambers, the first, second and third cavities being connected with the control valve to provide an alternate communication of either the first and second cavities with the third cavity, or the first and second cavities with the atmosphere.

The inventors' experiments have demonstrated that with the flow area of the outlet duct up to 20 $cm^2$, the time of switching the main valve from the open to the closed position, and vice versa, is essentially the same and does not exceed 1 msec.

If the gas source includes a reservoir containing a pressurized working medium, such as compressed gas (compressed air) or liquefied carbon dioxide, the main valve is mounted in the break of the duct between the outlet of the reservoir representing the lower-pressure space, and the airbag inlet representing the lower-pressure space.

With the above object in view, in a valve device comprising a main valve inserted between the lower-pressure space and the higher-pressure space, and a control valve actuating the main valve, the main valve comprises a hollow body defining the valve cavity and having a first duct connecting the valve cavity with the lower-pressure space, and a second duct connecting the valve cavity with the higher-pressure space, a valve seat being mounted in the first duct, comprising at least one annular flange defining a circular passage tapering towards the lower pressure space, and a stop member including a movable domed shutoff device with its vertex facing the first duct and coaxial therewith, and a guide, both located inside the valve cavity and coupled by a telescope joint, according to the invention, the guide has provided therein a first cavity with an outside hole at the first duct and coaxially with the duct, the first and the second cavities being connected with the control valve adapted to connect the first and second cavities with each other and the first cavity with the atmosphere.

The experiments carried out by the inventors have demonstrated that in this design, with a flow area of the first duct up to 20 $cm^2$, the time taken for the main valve to switch from the open to the closed position, and vice versa, is essentially the same and is not in excess of 1 msec.

Known in the art are electromagnetic valves with a response time not exceeding 3 msec (actually, this time may be further reduced to 2 msec, if electropneumatic valves such as those produced by Hoerbiger Company are used).

Accordingly, the valve device including an electropneumatic control valve with a response time of up to 3 msec and a main valve with a response time of up to 1 msec, allows the flow section of the duct with a flow of 20 $cm^2$ to be opened and closed within 4 msec, so that it can be used as a pneumatic distributor in various devices including a safety device, such as the inflatable safety cushion.

Considering that the average time of inflating the airbag to the ready state is approx. 40 msec, the pneumatic distributor may be used to produce from one to ten variable-length gas flow pulsed to pass through the flow section of the duct communicating through inlet of the airbag with the gas source.

BRIEF DESCRIPTION OF THE DRAWINGS

Other advantages of the proposed invention will be disclosed by way of examples of its preferred embodiment with reference to the accompanying drawings in which:

FIG. 1 and FIG. 2 show embodiments of a safety device, such as the safety cushion, for implementation, according to the invention, of the method of bringing an inflatable airbag to readiness.

Figure 1:
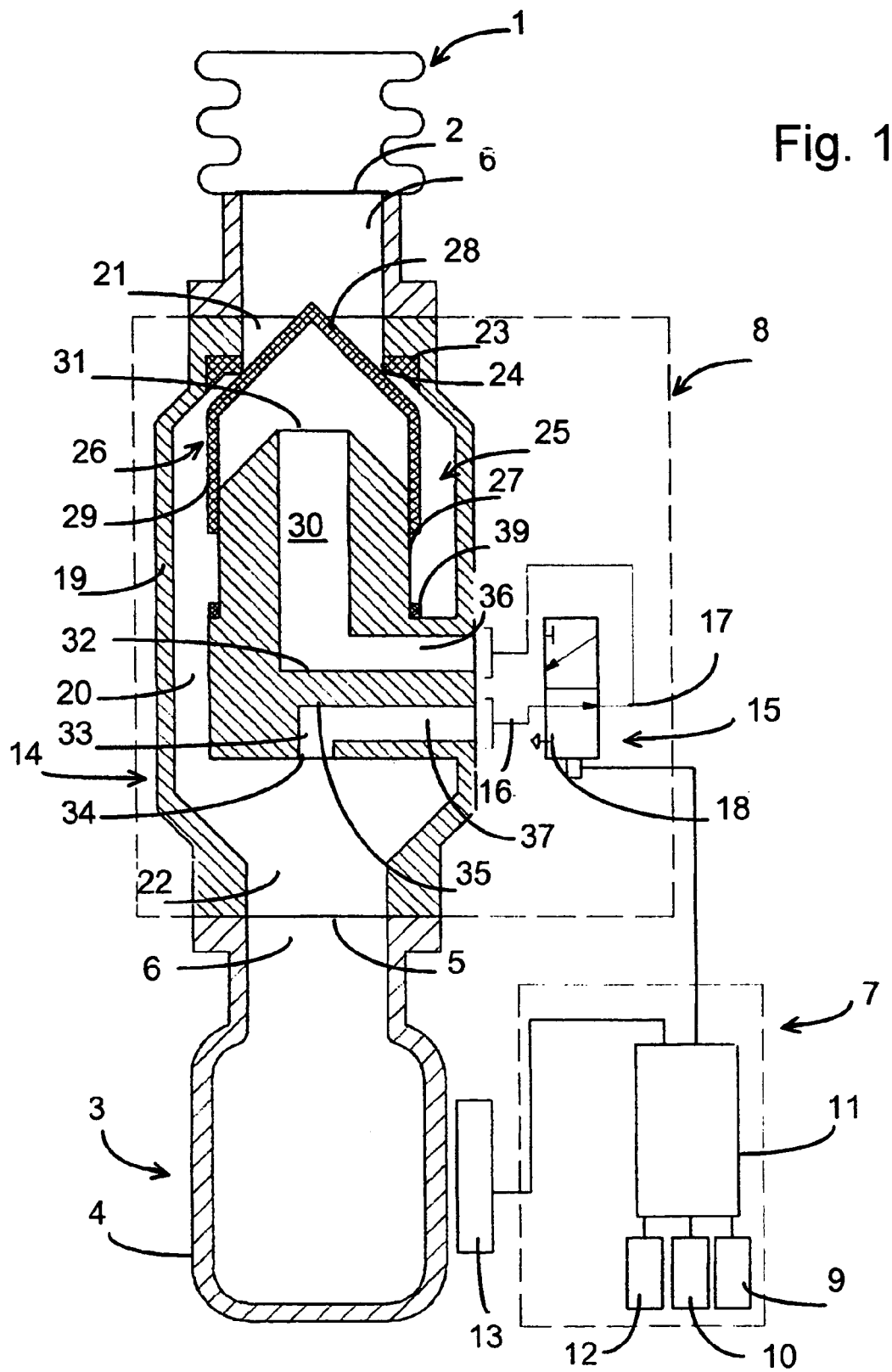
FIG. 1 represents a schematic diagram of safety device with a gas source comprising a reservoir with the pressurized working medium.

The safety device illustrated in FIG. 1 comprises an inflatable airbag 1 having an inlet opening 2 for receiving gas filling the airbag 1 to bring it to readiness, and a system for supplying gas to the airbag 1.

The gas supply system for the airbag 1 comprises a gas source 3 including a reservoir 4 with an outlet opening 5, filled with the pressurized working medium, a duct 6 for communication of the inlet 2 of the airbag 1 with the outlet 5 of the reservoir 4, a triggering unit 7 generating and feeding a signal to produce the gas flow from the gas source 3 to the airbag 1, and a valve device 8. The valve device 8 is formed by a pneumatic distributor with two stable positions: the open position (FIG. 3) in which the flow section of the duct 6 is open and gas is fed from the reservoir 4 to the airbag 1 through its inlet 2, and the closed position (FIG. 1), when the flow section of the duct 6 is closed and there is no gas supply to the airbag 1.

The working medium pumped into the reservoir 4 may by either compressed gas such as compressed air, or liquefied gas such as liquefied carbon dioxide, which is the most neutral for man out of all the liquefied gases.

The triggering unit 7 comprises an acceleration transducer 9, an IR position sensor 10 for sensing the position of the person to be protected with respect to the airbag, and a computer 11 connected with said sensors 9, 10 and with the valve device 8. The triggering unit 7 may be of a known configuration, such as disclosed, for example, in U.S. Pat. No. 5,400,487. Besides, it may comprise another combination of sensors, restricted, for example, to the acceleration transducer alone. The triggering unit may be modified in a known manner.

In case the gas source 3 employs liquefied carbon dioxide as the working medium, the triggering unit 7 comprises a sensor 12 for measuring the mass of the person to be protected, and the reservoir 4 is provided with a temperature controller 13 connected with the computer 11 and capable of changing the temperature of the reservoir 4 according to readings of the mass-measuring sensor 12.

The mass-measuring sensor 12 may be represented by a known sensor such as the strain gauge.

The temperature controller 13 may be designed as one of known configurations, such as that comprising the thermoelectric heating element (not shown) with the electric unit (not shown) controlled by the computer 11.

The valve device 8 comprises a main valve 14 and a control valve 15.

The control valve 15 is formed by an electropneumatic distributor 3/2 with two stable positions. The control valve 15 has three ducts, namely: a supply duct 16, an outlet duct 17 and an exhaust duct 18 communicating with the atmosphere. In one extreme position of the control valve 15 illustrated in FIG. 1, which will be referred to as the open position hereinbelow, the supply duct 16 is connected with the outlet duct 17, and the exhaust duct 18 is closed. In the other extreme position referred to as the closed position (FIG. 3), the outlet duct 17 is connected with the exhaust duct 18, and the supply duct is closed. The known piezoelectric pneumatic Hoerbiger valve with the switching time between positions not exceeding 2 msec may perform the function of the control valve 15 (catalogue copy appended). Another known control valve may also be used for the purpose, for example, the electric pneumatic valve of "Burevestnik" Company with a response time not exceeding 5 msec.

The main valve 14 comprises a hollow body inserted at the breakpoint of the duct 6 connecting the outlet 5 of the reservoir 4, which is high-pressure chamber, with the inlet 2 of the airbag 1, which is a low-pressure chamber.

The main valve 14 may be directly connected with the inlet 2 of the airbag 1 and the outlet 5 of the reservoir 4.

The hollow body 19 of the main valve forms a valve cavity 20. Provided within the body 19 are a first duct 21 communicating the valve cavity 20 of the main valve, through the duct 6, with the inlet 2 of the airbag 1, and a second duct 22 communicating the valve cavity 20, through the duct 6, with the outlet 5 of the reservoir 4. Fitted within the first duct 21 of the body 19 is a seat 23 of the main valve, having at least one annular flange 24.

Located inside the valve cavity 20 is a stop member 25 of the main valve, comprising a moveable domed shutoff device 26 with its vertex facing the first duct 21 and coaxial therewith, and a guide 27, joined together telescopically. The domed shutoff device 26 consists of a dome-shaped portion 28 and a cylindrical portion 29 integral therewith, which slides, as the main valve is operated, along its mating lateral cylindrical surface of the guide 27. The dome-shaped portion 28 of the shutoff device 26 forms a passage in the valve cavity 20, tapering in the outward direction from the cavity 20, its flow area being lowest adjacent the annular flange 24.

Figure 3:
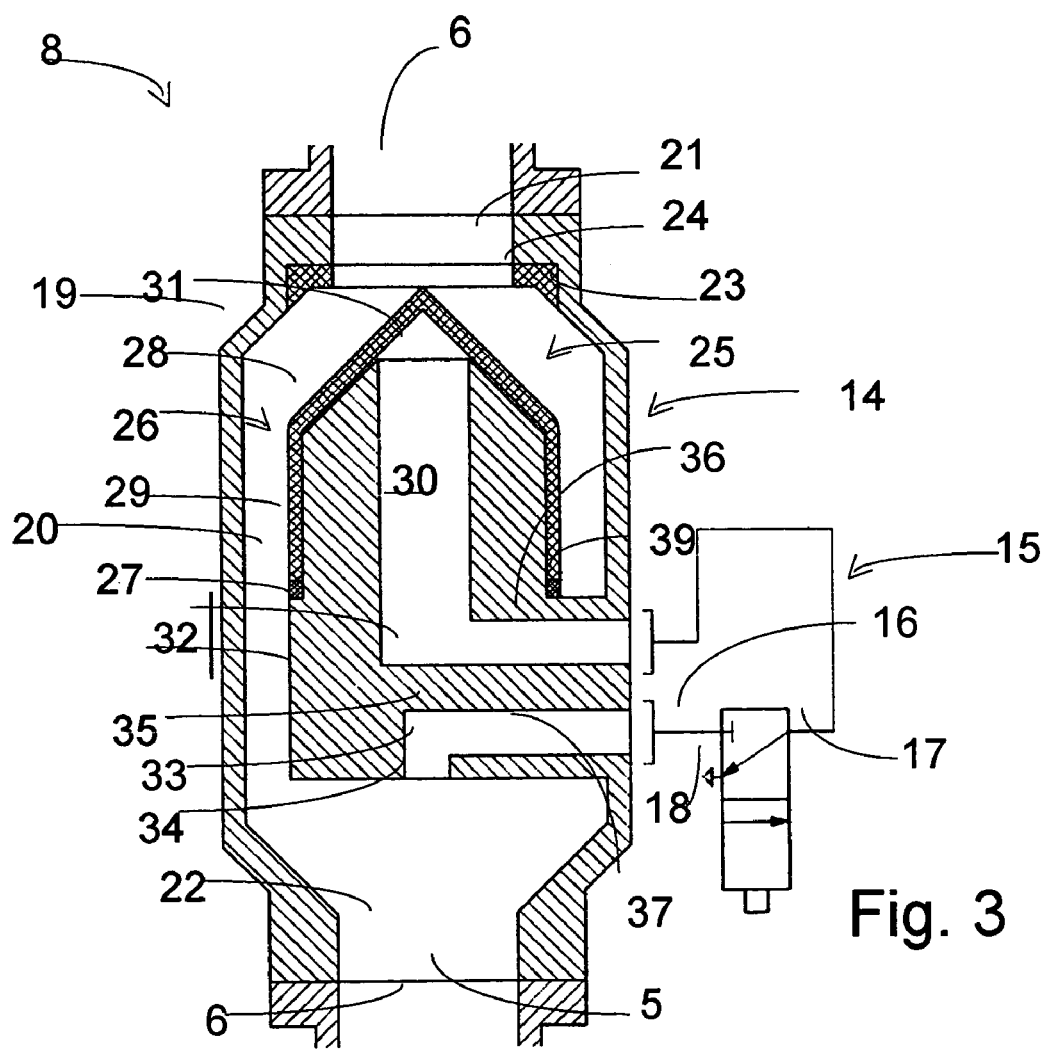
FIG. 3 is a schematic of the valve device of FIG. 1 in the open position.

The domed shutoff device 26 is made of an elastic material such as a shock-resistant plastic, so as to provide a tight fit of the domed portion 28 of the shutoff device 26 against the annular flange 24 of the seat 23 with the main valve 14 closed. The tight fit between the domed portion 28 of the shutoff device 26 and the annular flange 24 is also provided by the annular flange 24 of the seat 23 being made of a hard, shock-proof material, such as carbon-filled plastics. Within the guide 27, there is provided a first cavity 30 having an outside hole 31 in the direction of the first duct 21 and coaxial therewith, and an end wall 32 closing the cavity 30 inside the guide 27 from the opposite direction. Besides, provided in the guide 27 is a second cavity 33 with an outside hole 34 in the direction of the second duct 22 and coaxial therewith, and an end wall 35 closing the cavity 33 inside the guide from the opposite direction. The first cavity 30 and the second cavity 33 are connected by ducts 36 and 37, respectively, with the control valve 15. In this case, the duct 36 of the first cavity 30 of the main valve is connected with the outlet duct 17 of the control valve, with the latter in the open position (FIG. 1), and with the exhaust duct 18 of the control valve 15, when it is in the closed position (FIG. 3). The duct 37 of the second cavity 33 of the main valve is connected with the supply duct 16 of the control valve 15 when the latter is in the open position (FIG. 1) and is blanked off by the control valve 15, when it is closed.

Figure 2:
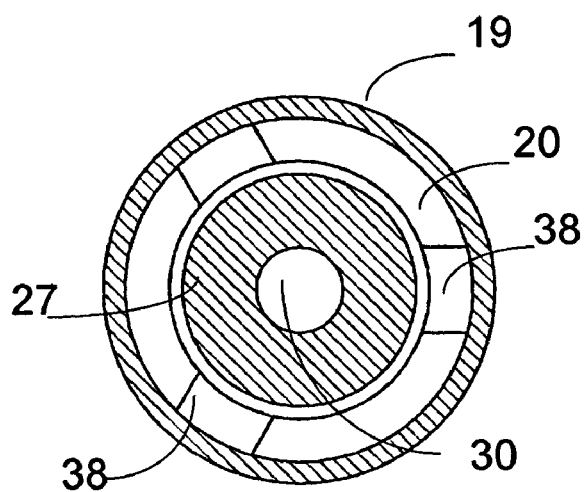
FIG. 2 is a section on the line 2—2 of FIG. 1.

So with the control valve 15 in the open position, the first and second cavities 30 and 33 of the main valve 14 communicate through the control valve 15, while with the control valve 15 closed, the first cavity 30 of the main valve, 14 communicates with the atmosphere, and its second cavity 33 is blanked off in the direction of the duct 37. The guide 27 is secured within the body 19 by two or three radial ribs 38 (FIG. 2). The ducts 36 and 37 pass through the body of the cylindrical guide 27, one of said radial ribs 38 and the body 19 of the main valve 14, before they join the control valve 15. The radial ribs 38 may be made integral with the guide 27.

In order to prevent the gas leaks from the valve cavity to the atmosphere, the guide 27 has on its cylindrical portion an annular ridge 39 of an elastic material which hermetically abuts against the end faces of the cylindrical portion 29 of the shutoff device 26, when the main valve 14 is in the open position (FIG. 3).

To minimize pressure losses in the valve cavity 20 of the main valve 14 and to streamline the production, the inside surface of the body 19 of the main valve 14, the cylindrical portion 29 of the shutoff device 26, the guide 27 and the first and second cavities 30 and 33 are all made in the form of coaxial circular cylinders. The radial ribs 38 are formed by thin-walled, smooth profiles extending along the longitudinal axis of the body 19 of the main valve 14 and having rounded-off edges as viewed from the second duct 22 of the body 17 and sharp edges as viewed from the opposite side, i.e. from the first duct 21 of the body 17. There is a rounded joint between the domed portion 28 of the shutoff device 26 and the cylindrical portion 29. Besides, the shape of the first duct 21 of the body 17, the profile of the domed portion 28 of the shutoff device 26, the shape of the annular flange 24 of the seat 23 are specified by known methods, assuming an undetached flow of compressed gas along these surfaces at a transonic speed (L. G. Loitsansky, Fluid Mechanics, M, Nauka, 1973, pp. 403–406).

The valve device 8 has two stable positions: closed (FIG. 1) and open (FIG. 3).

With valve device 8 in the closed position, the flow section of the duct 6 connecting the inlet 2 of the airbag 1 with the outlet 5 of the reservoir 4 is shut off by the main valve 14 being in the closed position. In this case, gas from the reservoir 4 (high-pressure space) does not enter the airbag 1 (low-pressure space). With the valve device in the open position the main valve 14 is open, and gas from the reservoir 4 flows into the airbag 1 through the valve cavity 20 of the main valve 14 along the duct 6.

The normal position of the valve device in the safety device is the closed position (FIG. 1).

With the valve device 8 in closed position, the main valve 14 is closed, while the control valve 15 is open.

In this case, the second cavity 33 and the first cavity 30 of the guide 27 of the main valve 14 are interconnected along the line: duct 37 of second cavity 33 of guide 27 of main valve 14—supply duct 16 of control valve 15—outlet duct 17 of control valve 15—duct 36 of first cavity 30 of guide 27 of main valve 14. Along this line, the working medium from the reservoir 4, such as compressed air, fills the first cavity 30 of the guide 27 and the space beneath the dome-shaped shutoff device 26. The domed portion 28 of the shutoff device 26 is forced by the compressed gas pressure against the annular flange 24 of the seat 23, forming a tight fit.

The open (FIG. 1) or closed (FIG. 2) position of the main valve 14 is determined by the position of the control valve 15.

When the position of the control valve 15 is changed to closed, the supply duct 16 of the control valve 15 is shut, and the outlet duct 17 is connected with the exhaust duct 18 and with the atmosphere. In this case, the duct 37 of the second cavity 33 of the guide 27 of the main valve 14 is blanked off, isolating the first cavity 30 of the guide 27 from the high-pressure source, i.e. the reservoir 4. The first cavity 30 communicates with the atmosphere along the path: duct 36 of first cavity 30 of guide 27 of main valve 14—outlet duct 17 of control valve 15—exhaust duct 18 of control valve 15, and the pressure in the first cavity 30 of the guide 27 and beneath the domed portion 28 of the shutoff device 26 drops. The compressed gas supplied from the reservoir 4 along the second duct 22 of the main valve 14 to the valve cavity 20 acts on the outside surface of the domed portion 28 of the shutoff device 26. Due to the pressure unbalance on the outside and inside surfaces of the domed portion 28 of the shutoff device 26, the shutoff device 26 is displaced along the cylindrical guide 27 until the face edges of the cylindrical portion 29 of the shutoff device 26 are thrust against the sealing elastic annular ridge 39 on the cylindrical guide 27, preventing the gas leak from the valve device 20 to the atmosphere.

The first duct 21 of the main valve 14 now opens and the gas stream from the reservoir 4 flows, through the valve cavity 20 of the main valve 14, to the airbag 1. The streamlined shape of the radial ribs 38 provides for minimum stall zones in the valve cavity 20. The rounded-off joint between the domed portion 28 and the cylindrical portion 29 of the shutoff device 26 leads to a reduced aerodynamic drag of the transonic flow. The domed shape of the shutoff device 26 ensures an unstalled transonic flow around the domed portion 28 of the shutoff device 26. All the above features of the design allow, with the main valve 14 in the open position, the lowest pressure difference in the valve cavity 20.

The experiments conducted by the inventors have demonstrated that the main valve, with a flow area of its first duct up to 20 cm$^2$, is opened within a time interval not exceeding 1 msec.

At the next switchover of the control valve 15, the supply duct 16 is connected with the outlet duct 17. In this case, the first cavity 30 and the second cavity 33 of the guide 27 of the main valve 14 are interconnected along the path: duct 36 of first cavity 30 of guide 27 of main valve 14—supply duct 16 of control valve 15—outlet duct 17 of control valve 15—duct 37 of second cavity 33 of guide 27 of main valve 14. The compressed gas from the reservoir 4 fills cavity 30 of the guide 27. Now the pressure within the first cavity 30 of the guide 27 will be equal to the total head in the high-pressure space (pressure of the compressed gas in reservoir 4). With an unstalled flow around the outside domed surface of the shutoff device 26, the pressure acting thereon is equal to a static pressure which is lower than the total pressure by the value of the velocity head. Due to the pressure unbalance, the shutoff device 26 moves along the cylindrical guide 27 until the domed portion 28 of the shutoff device 26 is thrust against the annular flange 24 of the seat 23. Acted upon by the pressure of compressed gas beneath the domed portion 28 of the shutoff device 26, this portion tightly fits the annular flange 24 of the seat 23, shutting the first duct 21 of the main valve 14.

The inventors experiments have demonstrated that with a flow area of the first duct 21 up to 20 cm$^2$, the main valve 14 is closed within 1 msec.

Thus the opening and closure of the main valve 14, with a flow area of the first duct 21 up to 20 cm$^2$, is made within an essentially equal time, not exceeding 1 msec.

Considering the response time of a known control valve 15 (approximately 2 msec), the time required for the controlled opening and closure of the valve device 8 does not exceed 3 msec, making it possible to use this valve device as a controlling pneumatic distributor in a safety device of the safety cushion type.

In addition, the aforementioned valve device 8 may be used as a controlling pneumatic distributor for air cylinders, e.g. on brake pumps, or as a controlled safety valve on chemical tanks or in other systems.

Figure 4:
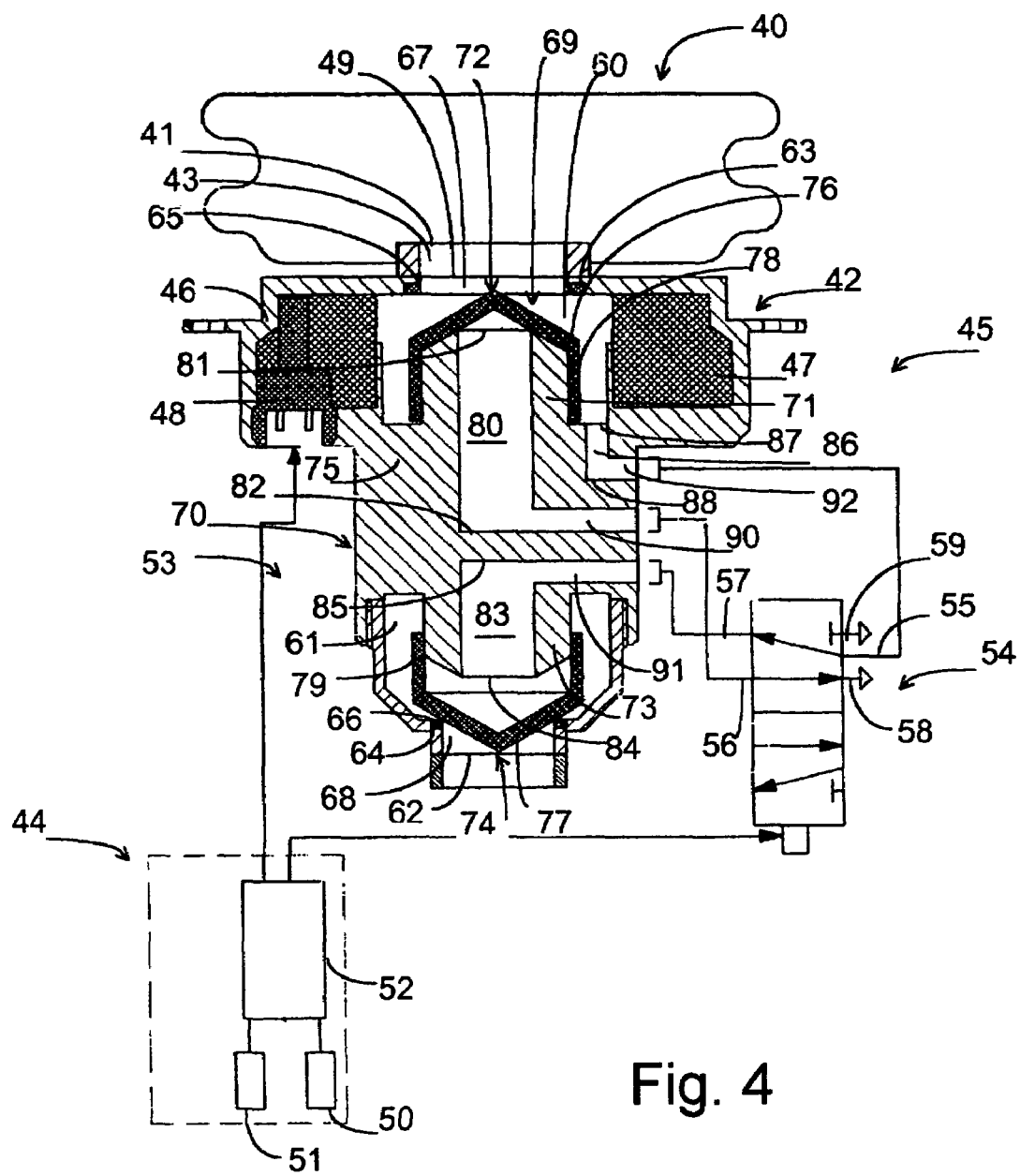
FIG. 4 is a schematic diagram of a safety device with a gas source comprising a pyrotechnical gas generator.

The safety device illustrated in FIG. 4, like the above device of FIG. 1, comprises a gas-inflated airbag 40 with an inlet 41 and a system for supplying gas to the airbag, including a gas source 42, a duct 43 connecting the inlet 41 of the airbag 40 with the gas source 42, a triggering unit 44 generating and feeding a signal to produce a gas flow from the gas source 42 to the airbag 40, and a valve device 45. The valve device 45 represents a pneumatic distributor with two stable positions: the open position (FIG. 6), when gas is fed to the airbag 40 through its inlet 41, and the closed position (FIG. 4), when the gas stream through the inlet 41 of the airbag 40 is interrupted.

The gas source 42 is a pyrotechnical gas generator including a body 46 enclosing a solid gas-producing substance 47 such as solid fuel. An electric blasting cap 48 is terminated at the solid gas-producing substance 47. An outlet 49 is made in the body 46, which joins the duct 43 connected with the inlet 41 of the airbag 40.

The triggering unit 44 comprises an acceleration transducer 50, a sensor 51 for sensing the position of the protected relative to the airbag 40, and a computer 52 connected with said sensors 50, 51, the valve device 45 and the electric blasting cap 48 of the gas source 42. The triggering unit 44 may be either essentially identical to the triggering unit 7 of the device shown in FIG. 1, or it may comprise a different combination of sensors, for example, restricted only to the acceleration transducer.

The valve device 45 comprises a main valve 53 and a control valve 54.

The control valve 54 is designed as an electropneumatic distributor 5/2 with two stable positions. The control valve 54 comprises five ducts: a supply duct 55, two outlet ducts 56 and 57 and two exhaust ducts 58 and 59 communicating with the atmosphere. In one extreme position of the control valve 54 which will be further taken as the open position (FIG. 4), the supply duct 55 is connected with the outlet duct 57, and the outlet duct 56 with the exhaust duct 58.

In the other extreme position of the control valve 54 which will be further taken as the closed position (FIG. 6), the supply duct 55 is connected with the outlet duct 56, and the outlet duct 57 with the exhaust duct 59.

The control valve may be for example, a well known piezoelectric pneumatic valve 52 produced by Hoerbiger Company with a response time of up to 2 msec, or an electric pneumatic valve—product of Burevestnik Company, with a response time not over 5 msec.

The main valve 53 is mounted inside the body 46 of the gas source 42 dividing the inner space of the body 46 into a first chamber 60 with the outlet 49 and second chamber 61 connected with the atmosphere through an exhaust port 62, both chambers communicating with each other. Placed within the first chamber 60 is the solid gas-producing substance 47. The solid gas-producing substance may be placed within the second chamber 61 as well.

Fitted inside the outlet opening 49 and the exhaust port 62 are a first seat 63 and a second seat 64 of the main valve 53, comprising each at least one annular flange 65 and 66. The first and second seats 63 and 64 define an outlet circular passage 67 of the main valve 53 and an exhaust circular passage 68 of the main valve 53, respectively.

In addition, the main valve 53 comprises a stop member 69 including a guide 70 having a first guiding portion 71 located in the first chamber 60 and telescopically joined to a first movable dome-shaped shutoff device 72, a second guiding portion 73 located in the second chamber 62 and telescopically joined to a second movable dome-shaped shutoff device 74, and a central portion 75 connected with the body 46 of the gas source 42 which forms, at the same time, the body of the main valve 53.

The vertex of the first movable shutoff device 72 faces the outlet circular passage 67 of the main valve 53 and is coaxial therewith.

The vertex of the second movable shutoff device 74 faces the exhaust circular passage 68 of the main valve 53 and is coaxial therewith.

The first and second shutoff device 72 and 74 comprise a domed portion 76 and 77, respectively, and a cylindrical portion 78 and 79, respectively.

The domed portion 76 of the first shutoff device 72 define ducts in the first chamber 60 and the second chamber 61, respectively, tapering outwardly from the chambers 60 and 61, the flow area of the ducts being at a minimum adjacent the annular flanges 65 and 66, respectively.

The shutoff device 72 and 74 or the annular flanges 65 and 66 made of an elastic material such as elastoplastics.

Provided in the first guiding portion 71 is a first cavity 80 with an outside opening 81 in the direction of the first chamber 60, coaxial with the outlet circular passage 67, and with an end wall 82 closing the first cavity 80 inside the guide 70. Provided in the second guiding portion 73 is a second cavity 83 with an outside opening 84 in the direction of the second chamber 61, coaxial with the exhaust circular passage 68, and with an end wall 85 closing the second cavity 83 inside the guide 70. In the central portion 75 of the guide 70, there is provided a third cavity 86 with an outside opening 87 in the direction of the first chamber 60, beyond the first domed shutoff device 72, and with an end wall 88 closing the third cavity 86 inside the guide 70.

Figure 5:
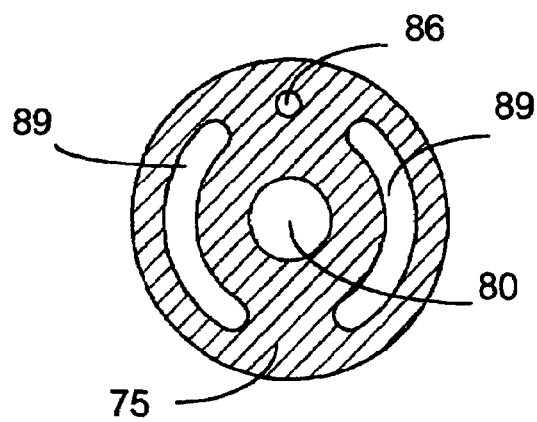
FIG. 5 is section on the line 5—5 of FIG. 4.

Besides, within the central portion 75 of the guide 70, there are provided ducts 89 (FIG. 5) connecting the first and second chambers 60 and 61.

The first, second and third cavities 80, 83, 86, respectively, are connected with the control valve 54 by ducts 90, 91, 92, respectively, provided in the central portion 75 of the guide 70.

In the first stable (open) position of the electric pneumatic control valve 54, the duct 90 of the first cavity 80 of the guide 70 of the main valve 53 is connected, through the outlet duct 55 and the exhaust duct 57 of the control valve 54, with the atmosphere. In this case, the ducts 92 (duct of the third cavity 86) and 91 (duct of the second cavity 83) of the main valve 53 are interconnected through the ducts of the control valve: the outlet duct 57 and the supply duct 55.

In the second stable (closed) position of the control valve 54, the duct 90 (of the first cavity 80) and the duct 92 (of the third cavity 86) of the guide 70 of the main valve 53 are interconnected through the supply duct 55 and the outlet duct 57 of the control valve 54, and the duct 91 of the second cavity 83 of the guide 70 of the main valve 53 is connected, through the supply duct 55 and the exhaust duct 58, with the atmosphere.

In order to minimize pressure losses in the valve device and to streamline the production process, the cylindrical portions the shutoff devices 72 and 74, the cylindrical portions 71 and 73 of the guide 70, and the first and second cavities 80 and 83 are shaped as coaxial circular cylinders. The third cavity 86 of the guide 70 may also be made in the form of a circular cylinder.

In normal working conditions of the safety device in FIG. 4, there is no gas in the gas source, and the valve device is inoperative.

The valve device 45 is actuated by triggering the gas generator, whereby an excess pressure is produced in the first chamber 60 of the body 46 of the gas source 42.

Figure 6:
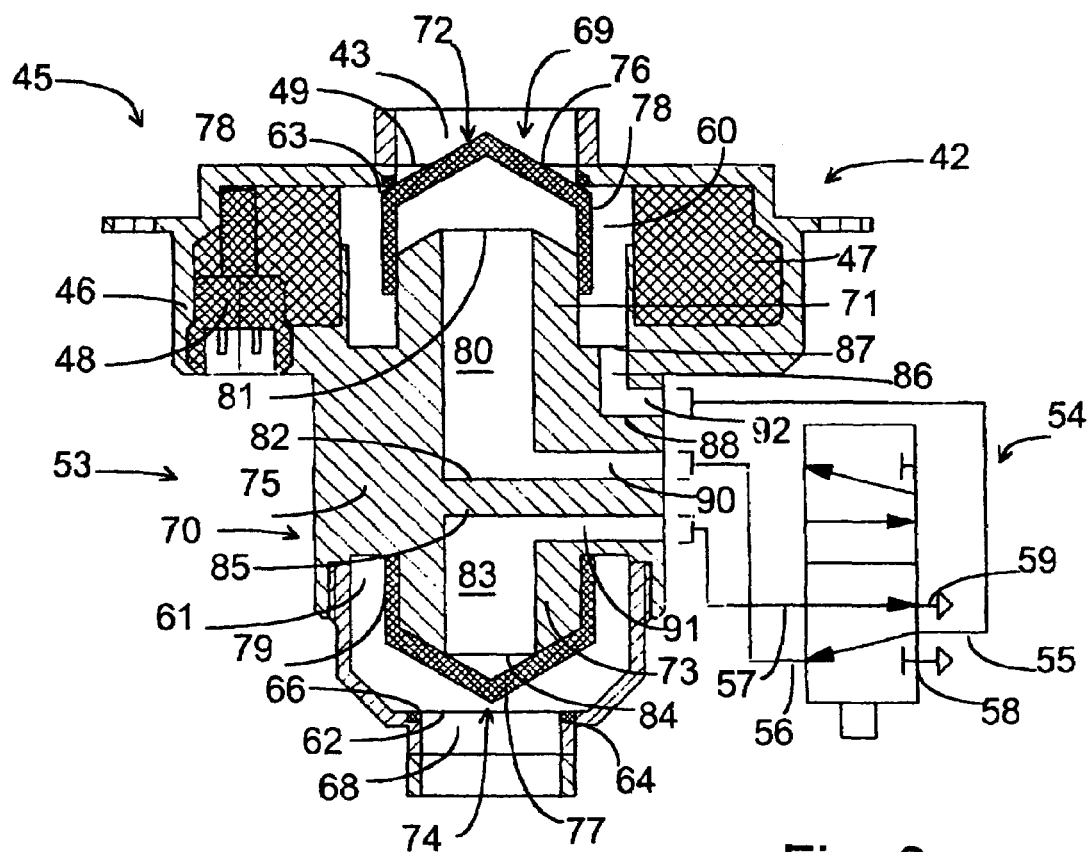
FIG. 6 is schematic of the valve device of FIG. 4 in the closed position.

It will be noted that the valve device 45 has two stable positions: open (FIG. 4) and closed (FIG. 6).

In the open position of the valve device, the main valve 53 and the control valve 54 are open.

In this case, the third cavity 86 and the second cavity 83 of the guide 70 of the main valve 53 are interconnected along the path: duct 92 of third cavity 86 of guide 70 of main valve 53—supply duct 55 of control valve 54—outlet duct 57 of control valve 54—duct 91 of second cavity 83 of guide 70 of main valve 53. Travelling along this path, gas from the first chamber 60 of the body 46 fills the second cavity 83 of the guide 70 and the space beneath the second dome-shaped shutoff device 74. As a result of the gas pressure, the domed portion 77 of the second shutoff device 74 tightly fits the annular flange 66 of the second seat 64, closing the exhaust circular duct of the main valve 53. The first cavity 80 of the guide 70 communicates with the atmosphere along the path: duct 90—outlet duct 56 and exhaust duct 58 of control valve 54. The pressure under the domed portion 76 of the first shutoff device 72 will be near atmospheric, while the outside surface of the domed portion 76 is under pressure of gas produced by the solid substance 47 located in the first chamber 60. As a result of the pressure unbalance, the first shutoff device 72 is displaced against the stop along the first guiding portion 71, the outlet circular passage 67 is open, and gas is supplied to the airbag 40 through the outlet 49 of gas source 42 along the duct 43.

The open (FIG. 4) or closed (FIG. 6) position of the main valve 53 is determined by the position of the control valve 54.

When the position of the control valve 54 is changed to closed, the first cavity 80 and the third cavity 86 of guide 70 of the main valve 53 are connected along the path: duct 90 of first cavity 80—outlet duct 56 of control valve 54—supply duct 55 of control valve—duct 92 of third cavity 86. The second cavity 83 communicates with the atmosphere along the path: duct 91—outlet duct 56 of control valve 54—exhaust 59 of control valve 54—duct 92.

Gas coming from the first chamber 60 fills, through the third cavity 86 of the guide 70, the first cavity 80 of the guide 70. The pressure in the first cavity 80 will then be equal to the total head in the high-pressure space (full pressure of gas in chamber 60). With an unstalled flow around the outside domed surface of the first shutoff device 72, the pressure exerted thereon is equal to the static pressure which is less than the full pressure by the value of the velocity head. Due to the pressure unbalance, the first shutoff device 72 is displaced along the guiding portion 71 until the domed portion 76 of the first shutoff device 72 bears against the annular flange 65 of the first seat 63. Acted upon by the gas pressure, the domed portion 76 of the first shutoff device 72 is snug against the annular flange 65 of the first seat 63, cutting off the outlet circular passage 67 and the outlet opening 49 of the gas source 42.

The pressure in the second cavity 83 of the guide 70 and beneath the domed portion 79 of the second shutoff device 74 drops. Gas arriving from the first chamber 60 along the ducts 89 acts on the outside surface of the domed portion 77 of the second shutoff device 74. Due to the unbalance of pressures exerted on the outside and inside surfaces of the domed portion 77 of the second shutoff device 74, it is displaced along the guiding portion 73, opening the exhaust circular passage 68 of the main valve 53.

Experiments conducted by the inventors have demonstrated that the main valve, with a flow area of the outlet circular passage 67 of up to 20 $cm^2$, is closed within the time interval not exceeding 1 msec.

At the next switchover of the control valve 54, the first cavity 80 of the guide 70 of the main valve 53 communicates with the atmosphere, and the third cavity 86 of the guide 70 is connected with its second cavity 83.

Gas from the first chamber 60 fills the second cavity 83 of the guide 70 and the gas pressure in the second cavity 83 is raised to the gas pressure in the first cavity 60, which is above the atmospheric pressure, whereas on the outside surface of the domed portion 77 of the second shutoff device 74, the pressure is near-atmospheric.

In the first cavity 80 of the guide 70, communicating with the atmosphere, the pressure drops down to the atmospheric pressure.

Because of the pressure unbalance, the first shutoff device 72 moves along the first guiding portion 71 until the domed portion 76 bears against the end face of the guiding portion 71, and the second shutoff device 74 moves along the second guiding portion 75 until its domed portion 77 bears against the annular flange 66 of the second seat 64. Acted upon by the gas pressure beneath the domed portion 77 of the second shutoff device 74, this portion closely adjoins to the annular flange 66 of the second seat 64, closing the exhaust circular passage 68, the outlet circular passage 67 and the outlet opening 49 of the gas source opening, to produce the gas flow into the airbag 40.

The inventors' experiments have demonstrated that the main valve 53, with a flow area of the outlet circular passage 67 up to 20 $cm^2$, opens within the time not exceeding 1 msec.

Thus the opening and closure of the main valve 53 is made essentially within the same time not exceeding 1 msec.

Considering the response time of the known control valve 54 (no greater than 3 msec), the time required for the controlled opening and closure of the valve device 45 does not exceed 4 msec, allowing the use of such valve device as a controlling pneumatic distributor in safety devices such as the inflatable safety cushion.

The method of bringing to readiness an inflatable airbag of the safety device will be further illustrated by an example of the safety device with its embodiments shown in FIG. 1 and FIG. 4. It will be noted that implementation of the method is not restricted to the embodiments of the safety device disclosed in the specification and can also be realized by other safety devices.

In accordance with the invention, the inflatable airbag of safety device of FIG. 1 is brought to readiness in the following way.

An alarm is produced by the acceleration transducer 9 sensing the negative acceleration of a vehicle. The transducer 9 measures acceleration of a vehicle, as the accident develops, and the result is transmitted to the computer 11. An IR sensor 10 determines the position of the person to be protected relative to the airbag, as the accident develops, also transmitting the data to the computer 11. Based on the readings of the sensors 9 and 10 during the accident, an optimum curve of the amount of gas enclosed within the airbag 1 as a function of time is found. The mode of filling up the airbag 1 implementing said optimum curve provides the most effective protection of people during the accident. The data received from the sensors 9 and 10 during the accident is processed and the optimum enclosed gas vs time curve determined by means of the computer 11, using known methods, such as disclosed in U.S. Pat. No. 5,400,487.

The optimum curve of gas enclosed in airbag 1 vs time is approximated, using, for example, a software support, by a step function. The approximating step function is expressed in terms of a pulsed supply of the gas stream into the airbag 1 by alternately opening and closing the flow section of the duct 6 connecting the airbag 1 with the gas source 3. The open flow section of the duct 6, when gas enters the airbag 1 through its inlet 2, corresponds to the sloped portions of the step function, while the closed flow section of the duct 6, when gas is not supplied to the airbag 1, corresponds to the horizontal portions.

The flow section of the duct 6 is opened and closed by the pneumatic distributor 8 having two stable positions: open (FIG. 1) and closed (FIG. 4). The pneumatic distributor 8 is controlled by the computer 11. The output of the computer 11 is a pulsed time signal specifying the open or closed position of the pneumatic distributor 8 according to the step function approximating the optimum "gas vs time" curve.

In this case, the limits of accuracy with which the optimum "enclosed gases vs time" curve is approximated are determined by the time of switching the pneumatic distributor from one position to the opposite one.

During the normal operation of the vehicle (no accident), the initial position of the pneumatic distributor 8 in the safety device described is the closed position (FIG. 1), when the flow section of the duct 6 connecting the inlet 2 of the airbag 1 with the gas source 3 is closed. Gas from the reservoir 4 is not fed into the airbag 1, and it is in a folded state.

In this case, the initial position of the control valve 15 is open, and that of the main valve 14 closed.

In emergency, the control valve 15 operates in response to the leading edge of the first electric pulse from the computer 11 being applied to its input. The control valve 15, after some delay relative to the leading edge of the electric pulse, which is determined by its response time (about 3 msec), changes its position to closed, and it is maintained as long as the electric pulse keeps acting. In response to the trailing edge of the electric pulse, the control valve 15 changes its position to open, after the same delay.

When the position of the control valve 15 is changed to closed, the main valve 14 operates. The main valve 14, after some delay relative to the control valve 15, which is determined by its response time (about 1 msec for the main valve represented in FIG. 1), changes its position to open, and it is maintained as long as the control valve 15 is closed. In this case, the flow section of the duct 6 is open, a gas stream from the reservoir 4 flows to the airbag 1 through the valve cavity 20 of the main valve 14. When the position of the control valve 15 is changed to open, the main valve 14, after the same delay, changes its position to closed, and the gas stream through the inlet 2 to the airbag 1 is interrupted. This is accompanied by generation of a gas flow pulse through the inlet 2 of the airbag 1.

Figure 7:
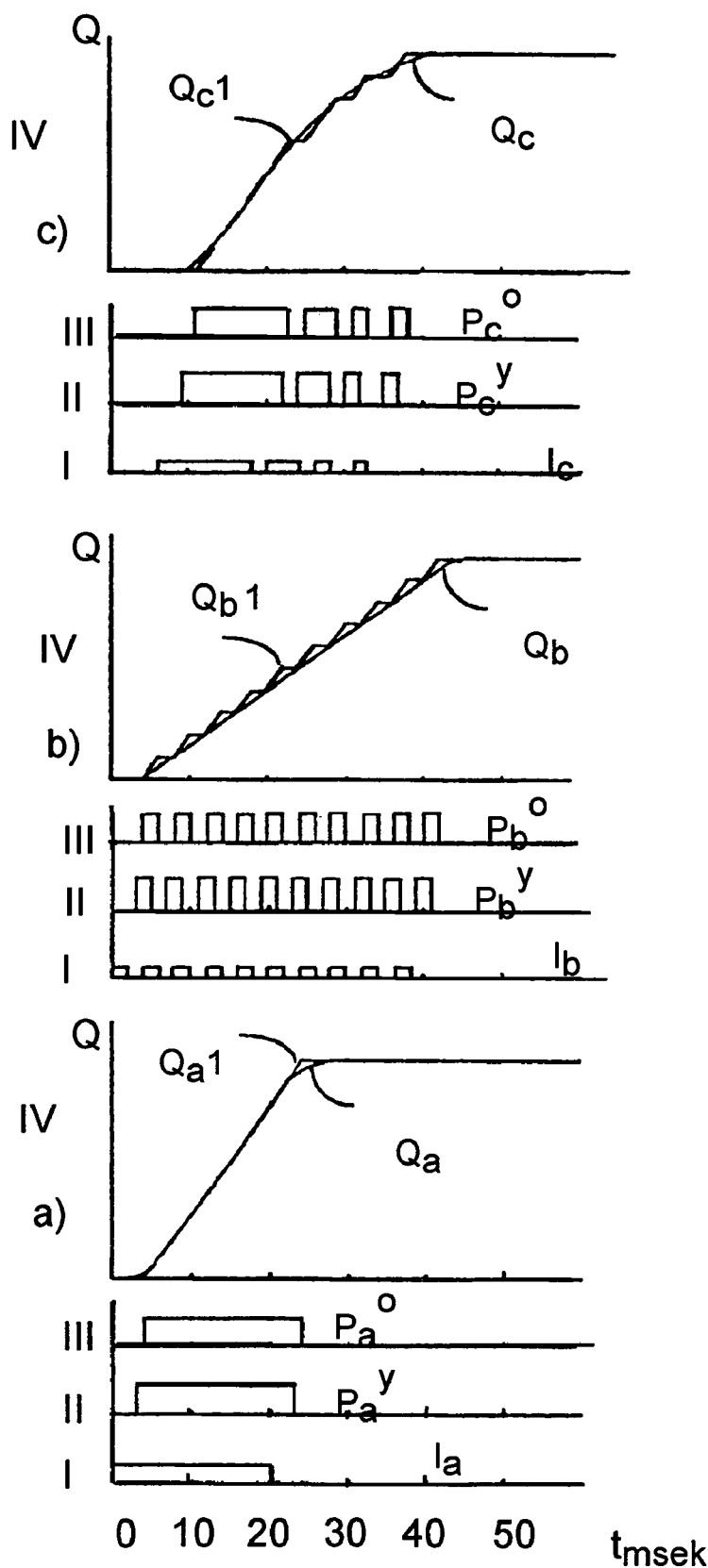
FIG. 7 represents curves of the 'enclosed gas vs time' relationship and time diagram of the pneumatic distributor.

The proposed method is illustrated in FIG. 7. The plot IV of FIG. 7 shows three ideal-case optimum 'amount of gas enclosed in airbag 1 vs time' curves, for two limiting cases and an intermediate case. Case(a): "severe accident" characterized by a high braking acceleration of a vehicle and the proximity of the person protected to the airbag—curve Qa. Case (b): "mild accident" characterized by a low braking acceleration of a vehicle and a great distance from the person protected to the airbag—curve Qb. Case (c): one of possible intermediate cases between "severe accident" and "mild accident" —curve Qc, for example: high speed and great distance from the person to the airbag 1; low speed and small distance; multiple impact etc.

Plot IV of FIG. 7 also shows three approximating step functions of the 'enclosed gas vs time' relationship: curve Qa1, Qb1, Qc1 for the cases (a), (b), and (c), respectively.

It will be seen from FIG. 7 that for the case (a), the optimum 'gas enclosed vs time' curve Qa within the rising section is essentially linear and is at a large angle to the time axis, which corresponds to the high speed of filling the airbag for the entire period of bringing it to readiness. The curve Qa is here approximated by a single-step function Qa1.

The optimum curve Qb for case (b) is also essentially linear within the rising section, but has a smaller slope to the time axis, than curve Qa, showing a low filling speed for the whole period of inflating the airbag. In this case, curve Qb is approximated by a multistep function Qb1 consisting of practically uniformly alternating sloping and level sections whose number is determined by the maximum possible number of switchings of pneumatic distributor for the entire period of filling the airbag to bring it to readiness. Assuming that the airbag must be brought to its ready-state within 40 msec from the onset of accident, and the switching time of the pneumatic distributor 8 does not exceed 4 msec (the switching time of the main valve 14 is no greater than 1 msec, and the switching time of the control valve is approx. 3 msec), the approximating multistep function Qb1 includes ten sloping sections and ten level sections.

The optimum curve Qc for the case (c) is nonlinear: it slowly rises within the initial time section, goes up rather sharply in the middle section and more smoothly in the final section. Accordingly, the approximating function Qc1 is a multistep function with sloping and level sections of variable length.

The diagram 1 of FIG. 7 shows electric pulses coming from the outlet of the computer 11 (FIG. 1) and applied to the input of the control valve 15 for the cases (a), (b) and (c).

Also represented in FIG. 7 are time diagrams II and III showing the operation of the pneumatic distributor 8 for the cases (a), (b) and (c).

Diagram II represents gas flow pulses in the exhaust duct 18 of the control valve 15 defining the open or closed position of the control valve 15. Diagram III represents the gas flow pulses received by the airbag 1 from the reservoir 4 through the first duct 21 of the main valve and defining the closed or open position of the main valve 14.

Speaking in physical terms, the opening and closing of the valve is accompanied by transients at the gas flow pulse edges. However, as the switching time of the valve is small compared to the pulse duration, the gas flow pulses are symbolically represented as square pulses in the diagram.

The electric pulses and the gas flow pulses in diagrams I–III for the cases (a), (b) and (c) are designated by symbols, Ia, Ib, Ic and, $Pa^y$, $Pb^y$ and $Pc^y$, $Pa^o$, $Pb^o$ and $Pc^o$, respectively.

The output of the computer 11 corresponding to the single—step function Qa1 is a single electric pulse Ia. The width (Ta) of the electric pulse Ia is determined by the time for which the amount of gas in the airbag increases in accordance with the approximating step function Qa1, taking account of the time required for the operation of the valves 15 and 14. According to plot IV, the width of the electric pulse Ia, is equal to Ta=20 msec.

At the leading edge of the electric pulse Ia, the control valve 15 is closed after a delay time of 3 msec, and it remains closed for a period Ta of the electric pulse. In this case, the supply duct 16 of the control valve 15 is closed, and the outlet duct 17 is connected with the exhaust duct 18 and with the atmosphere. The first cavity 30 of the guide 27 is connected with the atmosphere along the path: duct 36—outlet duct 17 of control valve 15—exhaust duct 18 of control valve 15. The pressure in the first cavity 30 of the guide 27 and beneath the domed portion 28 of the shutoff device 26 drops. The working medium such as compressed gas supplied from the reservoir 4 along the second duct 22 to the valve cavity 20 acts on the outside surface of the domed portion 28 of the shutoff device 26. Due to the unbalance of pressures acting on the outside and inside surfaces of the domed portion 28 of the shutoff device 26, the latter is displaced along the cylindrical guide 27, opening the first duct 21 of the main valve 53 through which gas flows to the airbag 1. The main valve 14 opens with a delay of 1 msec after the closure of the control valve 15, and it remains open as long as the control valve 15 is closed, during the time Ta.

At the trailing edge of the electric pulse Ia, the control valve 15 is opened with a delay of 3 msec, the supply duct 16 is connected with the outlet duct 17, and the exhaust duct 18 is closed. In this case, the second cavity 33 and the first cavity 30 of the guide 27 of the main valve 14 are interconnected along the path: duct 37—supply duct 16 of control valve 15—outlet duct 17 of control valve 15—duct 36. Along this path, gas from the reservoir 4 fills the first cavity 30 of the guide 27 and the space beneath the domed shutoff device 26. The domed portion 28 of the shutoff device 26, acted upon by gas pressure, is displaced along the guide 27 and closely adjoins to the annular flange 24 of the seat 23, cutting off the flow section of the first duct 21 and interrupting the gas flow to the airbag 1. The main valve 14 is closed with a delay of 1 msec after the opening of the control valve 15.

Thus a single gas pulse $Pa^y$ in the exhaust duct 18 of the control valve 15 and a single gas flow pulse $Pa^o$ in the first duct 21 of the main valve 14 correspond to the single electric pulse Ia. The single pulse $Pa^o$ of the gas flow to the airbag 1 from the reservoir 4 through the valve cavity 20 of the main valve 14 provides for a quick inflation of the airbag 1, in accordance with the optimum curve Qa. In this case, the excess pressure in the airbag brought to readiness can be adjusted by controlling the width of the pulse $Pa^o$.

The output of the computer 11, corresponding to the multistep function Qb1 is a sequence of electric pulses of the same width with the same time spaces between the pulses, equal to the width of the pulses Ib. At the leading edges of each electric pulse Ib, the control valve 15 is closed, with a time delay of 3 msec relative to the leading edge of the electric pulse Ib, while the main valve 14 is opened with a delay of 1 msec relative to the pulse $Pb^y$. Accordingly, at the trailing edges of each electric pulse Ib, the control valve 15 is opened with a delay of 3 msec relative to the trailing edge of the electric pulse Ib, while the main valve 14 is closed with a delay of 1 msec relative to the pulse $Pb^y$. In this case, sequence of ten identical gas flow pulses $Pb^o$ to the airbag 1 from the reservoir 4 through the valve cavity 20 of the main valve 14 is generated. In the spaces between the pulses $Pb^o$, gas is not fed to the airbag 1. The duration of the pulses $Pb^o$ and the duration of the spaces between these pulses are equal to those of the electric pulses Ib correspondingly.

In this case, the gas supply to the airbag, in accordance with the multistep function Qb1, as a sequence of short gas flow pulses with the spaces between pulses of the same duration, provides a smooth inflation of the airbag until it is brought to readiness.

The output of the computer 11, corresponding to the step function Qc1, is a sequence of electric pulses of different width with unequal time spaces between the pulses. According to the electric pulses, there is generated a sequence of gas flow pulses $Pc^o$ to the airbag 1 from the reservoir 4 through the valve cavity 20 of the main valve 14, providing the mode of filling the airbag 1 corresponding to the optimum curve Qc.

The examples in FIG. 7 demonstrate that the pulsed gas supply through the inlet 2 of the airbag 1 with a controlled duration of gas flow pulses and the spaces between the pulses allows the adjustment, within a wide range, of the airbag filling speed and the excess pressure in the inflated airbag.

Figure 8:
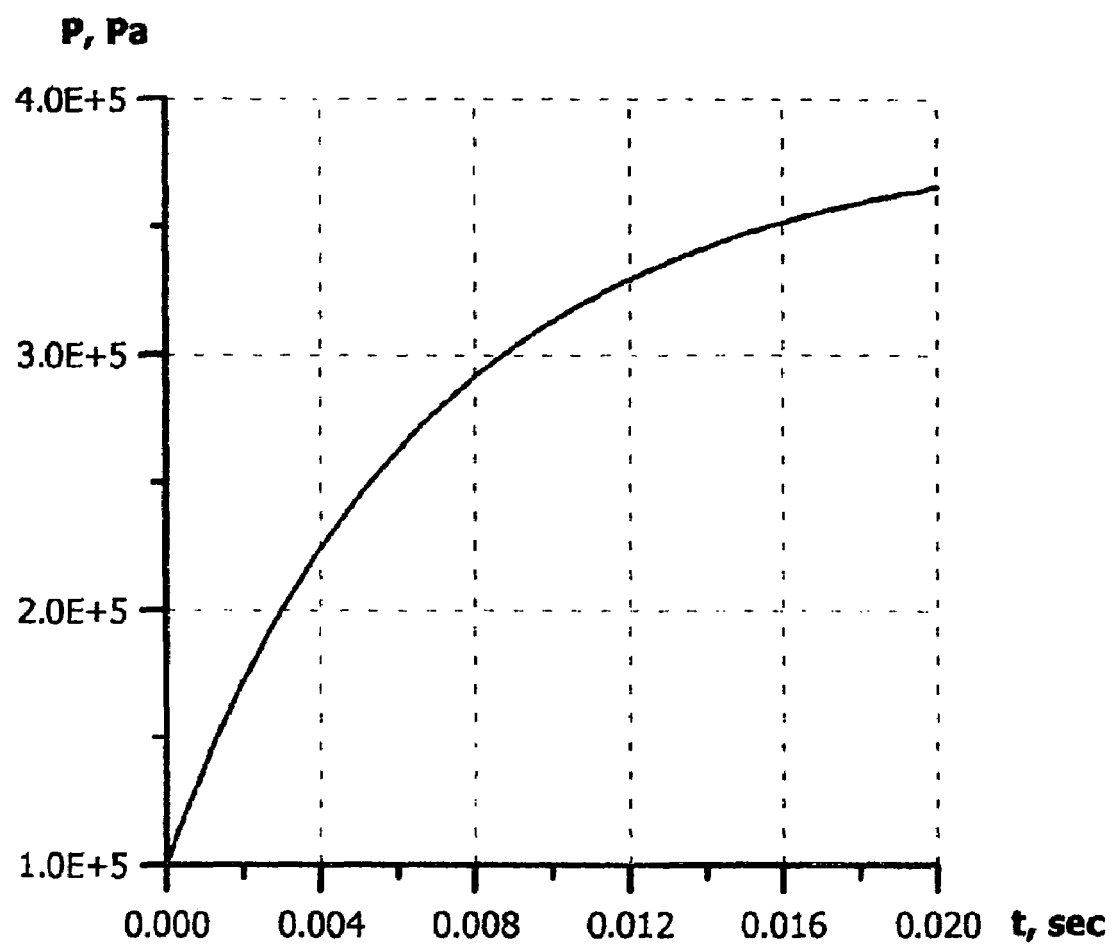
FIG. 8 is an estimated showing the gas pressure in the airbag as a function of time.

The calculations made by the inventors have shown that with an initial pressure of the compressed gas in the reservoir of $150 \times 10^5$ Pa (Pascal), with a reservoir volume of $3 \times 10^{-3}$ m$^3$, and the first duct 21 of the main valve having a flow area of 7 cm$^2$, the pressure in the low-pressure space reaches the value $3.5 \times 10^5$ Pa within 20 msec. The estimated curve of the pressure of gas within the airbag as a function of time, for the above parameters, is represented in FIG. 8.

It is apparent that as the flow area of the duct 21 increases, the rate of filling the low-pressure space will rise, though at the expense of a larger size of the safety device.

If, in a safety device shown in FIG. 1, the reservoir 4 of the gas source 3 is filled with liquefied carbon dioxide, the mode of filling the airbag 1 is further adjusted by changing the initial pressure of liquefied carbon dioxide in the reservoir 4, depending on the person's mass. As the passenger's weight increases, a higher initial pressure of the working medium in the reservoir 4, causes, other things being equal, a faster and, hence, "harder" inflation of the airbag 1 than in the case of a light passenger, when because of a low initial pressure, the airbag is filled more slowly and will be "softer".

The value of the initial pressure of the liquefied carbon dioxide in the reservoir 4 is controlled by changing its temperature in accordance with the known temperature dependence of the pressure of saturated vapors of liquefied carbon dioxide.

As the person to be protected takes a seat in the vehicle, the sensor 12 measures the mass of the person and sends the data to computer 11, a signal is transmitted from the computer 11 to the temperature controller 13 of the reservoir 4, specifying the operating mode of the temperature controller 13 which provides the temperature of liquefied carbon dioxide in accordance with the required initial pressure. In this case, the specified initial pressure of gas in reservoir 4 is set before the vehicle starts to move.

In case liquefied carbon dioxide is used as the working medium in the gas source, the adjustable airbag inflation may be restricted to the above changing of the initial gas pressure according to the person's mass. A more effective protection, however, is provided in conjunction with the aforementioned pulsed gas supply to the airbag. In this case, the value of the initial pressure of liquefied gas determines the amplitude of the gas flow pulse fed to the airbag 1 from the gas source 3.

The method of bringing to readiness the inflatable airbag 40 of a safety device shown in FIG. 4 is implemented in a way essentially similar to the above method realized in a safety device represented in FIG. 1.

One difference here is that, during normal operation of the safety device, the pneumatic distributor 45 is open.

In case of accident, the computer 11 generates two signals: a time pulse signal applied to the control valve 54 which controls the operation of the main valve 53, and a second signal to the electric blasting cap 48, initiating the ignition of the gas-producing solid substance 47 and generation of the gas flow to the airbag 40.

In this case, the initial position of both the control valve 54 and the main valve 53 is the open position (FIG. 4).

At the leading edge of the electric pulse received by the control valve 54 from the computer 11, the control valve 54 and the main valve 53, after successive delays of 3 msec and 1 msec, respectively, change their positions to the opposite ones, producing gas flow pulses to the airbag through the duct 43.

The control of the gas flow pulse duration provides for an adjustable airbag inflation.

The methods of bringing to readiness the airbag of safety device, as described above, provides a wide range of airbag-filling modes, enabling a mode to be selected, during the accident, which best approximates the optimum 'enclosed gas vs time' curve. Thereby the most effective protection of person in the vehicle, during the accident, is ensured.

The invention claimed is:

1. A safety device for installation inside a vehicle, the vehicle having an inflatable airbag equipped with an inlet for receiving gas filling the airbag to its ready state, a system for supplyng gas to the airbag, including a gas source, and a triggering unit, the safety device comprising: a valve device having a main valve coupled before the airbag inlet, the main valve having an open stable position wherein gas from the gas source is fed to the airbag through its inlet, and a closed stable position wherein the gas flow through the airbag inlet is interrupted; and, a control valve for causing the main valve to be switched from one stable position to the opposite stable position.

2. A safety device of claim 1 characterized in that the valve device is capable of changing from one stable position to the other at least three times within the period of filling the airbag to its ready state.

3. A safety device of claim 1 characterized in that the valve device is capable of changing from one stable position to the other within a period not exceeding 3 to 6 msec.

4. A safety device of claim 1 characterized in that the control valve is designed as an electric pneumatic distributor with two stable positions.

5. A safety device of claim 1 characterized in that the triggering unit comprises an acceleration transducer, a position sensor for sensing the position of the person to be protected with respect to the airbag, and a computer connected with said sensors and with the control valve, the computer being capable of determining, from the sensor readings, during the accident, the airbag-filling mode which is optimum for person's protections, and of feeding to the control valve, in accordance with said mode, electric signals causing the control valve to be switched from one stable position to the opposite one.

6. A safety device of claim 1 characterized in that the gas source includes a reservoir with a pressurized working medium.

7. A safety device of claim 6 characterized in that compressed gas is used as working medium.

8. A safety device of claim 6 characterized in that liquefied carbon dioxide is used as working medium.

9. A safety device of claim 8 characterized in that the triggering unit comprises a sensor for measuring the mass of the person protected, connected with the computer, and the reservoir of the gas source is provided with a temperature controller connected with the computer, and capable of changing of the temperature of liquefied carbon dioxide in the reservoir, depending on the readings of said sensor.

10. A safety device of claim 1 wherein the gas source is formed by a pyrotechnical gas generator and comprises a body with an outlet fluid coupled with airbag inlet, a solid gas producing substance place inside the body, and an electric blasting cap connected with a computer in the triggering unit;

wherein the main valve is mounted within the body of the gas source, dividing the space of the body into a first chamber with an outlet coupled with the airbag inlet, and a second chamber communicating with the atmosphere through an exhaust port, both chambers communicating with each other, a first seat and a second seat being mounted within the outlet and the exhaust port, comprising each at least one annular flange defining a circular passage tapering outwards from the body space, the main valve comprising a stop member including a guide having a first cylindrical guiding portion located in the first chamber and telescopically joined to the first movable dome-shaped shutoff-device with its vertex facing the outlet and coaxial therewith, a second cylindrical guiding portion located in the second chamber and telescopically joined to a second dome-shaped shutoff device with its vertex facing the exhaust port and coaxial therewith, and a central portion coupled with the body of the gas source, the first cylindrical guiding portion having provided therein a first cavity with an opening in the direction of the first chamber, coaxial with the outlet, the second guiding portion having provided therein a second cavity with an opening in the direction of the second chamber, the central portion having provided therein a third cavity with an opening in the direction of the first chamber, beyond the domed shutoff device, and ducts connecting the first and second chambers, the first, second and a third cavities being connected with the control valve, the control valve being capable of alternately fluid coupling the first and second cavities with the third cavity or the first and second cavities with the atmosphere.

11. A safety device of claim 10 wherein said control valve comprises an electrical pneumatic distributor having two stable positions, wherein in the first stable position of the control valve, the first cavity communicates with the atmosphere and the outlet is open, the second cavity is connected with the third cavity, and the exhaust port is closed by the second shutoff device, and in the second stable position of the control valve, the first cavity is connected with the third cavity and the outlet is closed by the first shutoff device, the second cavity communicates with the atmosphere and the exhaust port is open.

12. A safety device of claim 10 characterized in that the solid gas-producing substance is enclosed the first chamber.

13. A safety device for installation inside a vehicle, the vehicle having an inflatable airbag equipped with an inlet for receiving gas filling the airbag to its ready state, and a system for supplying has to the airbag, including a gas source and a triggering unit, the safety device comprising:

a valve device having a main valve and a control valve, the main valve being coupled to the airbag inlet, having an open stable position wherein gas from the gas source is fed to the airbag through its inlet, and a closed stable position wherein the gas flow trough the airbag inlet is interrupted, wherein the main valve couples between the airbag and the gas source, and comprises a hollow body defining a valve cavity and having a first duct connecting the valve cavity with the inlet of the airbag, and a second duct connecting the valve cavity with the gas source, a seat being mounted in the first duct, comprising at least one annular flange defining a circular passage tapering towards the inlet of the airbag, and a stop member including a movable dome-shaped shutoff device with its vertex facing the first duct and coaxial therewith, and a guide having provided therein a first cavity having an opening in the direction of the first duct and a second cavity having an opening in the direction of the second duct, the dome-shaped shutoff device and the guide both located inside the valve cavity and telescopically joined together, the first and second cavities being connected with the control valve capable of alternately providing fluid coupling between the first and second cavities, or between the first cavity with the atmosphere.

14. A safety device of claim 13 wherein the control vale comprises an electric pneumatic distributor having two stable positions, wherein in the first stable position of the control valve, the first and second cavities of the main valve are interconnected, and the first duct being closed by the shutoff device, and in the second stable position of the control valve, the first cavity of the main valve communicates with the atmosphere and the first duct is open.

15. A valve device comprising a control valve and a main valve connected therewith, the main valve coupling between a low-pressure space and a high-pressure space; the main valve comprising a hollow body defining a valve cavity and having a first duct connecting the valve cavity with the low-pressure space and a second duct connecting the valve cavity with the high-pressure space, a valve seat being mounted in the first duct, comprising at least one annular flange defining a circular passage tapering towards the low-pressure space, and a stop member including a movable dome-shaped shutoff device with its vertex facing the first duct and coaxial therein, and a guide, the movable dome-shaped shutoff device and the guide both located inside the valve cavity and telescopically joined together, characterized in that provided within the guide is a first cavity having an opening in the direction of the first duct and a second cavity having an opening in the direction of the second duct the first and second cavities being connected with the control valve capable of alternately connecting either the first and second cavities to each other, or the first cavity with the atmosphere.

16. A valve device of claim 15 characterized in that an electric pneumatic distributor with two stable positions is used as the control valve and in the first stable position of the control valve, the first and second cavities of the main valve are interconnected, with the duct closed by the shutoff device, and in the second stable position of the control valve, the first cavity of the main valve communicates with the atmosphere and the first duct is open.

17. A valve device of claim 16 characterized in that a circular ridge of an elastic material is provided on the outside surface of the guide, forming a sealed contact with the faces of movable shutoff device, with the first duct of the main valve in the open position.

18. A valve device of claim 16 characterized in that the first and second cavities are shaped as a circular cylinder.

19. A valve device of claim 16 characterized in that the shutoff device is made of an elastic material.

20. A valve device of claim 16 characterized in that the seat of the main valve is made of an elastic material.

21. A valve device of claim 16 characterized in that the guide is secured inside the body by at least two radial ribs, the first and second cavities of the cylindrical guide being connected with the control valve by ducts passing through the body of cylindrical guide, at least one of said radial ribs and the body of the main valve.

22. A valve device of claim 15 characterized in that the guide is shaped as a circular cylinder.

* * * * *